(12) United States Patent
Zhang

(10) Patent No.: US 10,567,657 B2
(45) Date of Patent: Feb. 18, 2020

(54) IMAGE PROCESSING METHOD AND SYSTEM FOR VISION SYSTEM

(71) Applicant: SHANGHAI BIZHI BIONIC TECHNOLOGY CO., LTD, Shanghai (CN)

(72) Inventor: Xiaolin Zhang, Shanghai (CN)

(73) Assignee: SHANGHAI BIZHI BIONIC TECHNOLOGY CO., LTD, Shanghai (CN)

( * ) Notice: Subject to any disclaimer, the term of this patent is extended or adjusted under 35 U.S.C. 154(b) by 38 days.

(21) Appl. No.: 15/737,426

(22) PCT Filed: Mar. 17, 2017

(86) PCT No.: PCT/CN2017/077046
§ 371 (c)(1),
(2) Date: Dec. 18, 2017

(87) PCT Pub. No.: WO2017/167033
PCT Pub. Date: May 10, 2014

(65) Prior Publication Data
US 2018/0139388 A1 May 17, 2018

(30) Foreign Application Priority Data
Mar. 30, 2016 (CN) .......................... 2016 1 0192216

(51) Int. Cl.
*H04N 5/232* (2006.01)
(52) U.S. Cl.
CPC ..... *H04N 5/23267* (2013.01); *H04N 5/23258* (2013.01)
(58) Field of Classification Search
CPC ... H04N 5/23267; H04N 5/23258; G06T 3/60
See application file for complete search history.

(56) References Cited

U.S. PATENT DOCUMENTS

| 4,818,858 A * | 4/1989 | Sorimachi | G02B 27/22 250/203.2 |
| 6,385,334 B1 * | 5/2002 | Saneyoshi | H04N 13/111 382/154 |

(Continued)

FOREIGN PATENT DOCUMENTS

| CN | 1492668 A | 4/2004 |
| CN | 101476874 A | 7/2009 |

(Continued)

*Primary Examiner* — Luong T Nguyen
(74) *Attorney, Agent, or Firm* — Muncy, Geissler, Olds & Lowe, P.C.

(57) ABSTRACT

The present invention provides an image processing method for a vision system. The vision system includes a central processor, at least two camera groups a sensor for obtaining a rotation angle signal of each of the camera groups. The camera groups each includes at least one camera and is configured to capture an image and send it to the central processor. The sensor is configured to send the obtained rotation angle signal to the central processor. Wherein during a conjugate rotation of two of the camera groups about respective optical axes thereof, the central processor is configured to perform rotation angle compensation on images based on an angle of rotation of the camera groups. The present invention solves the problem of unclear images captured by a camera that is rotating about its own optical axis in response to the rotation of a target object or scene. In particular, it solves the problem of vertical offsets between images captured by two camera groups that are rotating about their own optical axes conjugately for a certain reason, for example, when they are tracking a target object.

12 Claims, 1 Drawing Sheet

(56) References Cited

U.S. PATENT DOCUMENTS

| | | | | |
|---|---|---|---|---|
| 6,674,892 B1* | 1/2004 | Melen | ............... | G06K 9/03 |
| | | | | 348/42 |
| 7,272,306 B2* | 9/2007 | Zhang | ............... | B25J 9/1697 |
| | | | | 348/159 |
| 2015/0271474 A1* | 9/2015 | Shoji | ............... | G06T 7/80 |
| | | | | 348/47 |

FOREIGN PATENT DOCUMENTS

| | | |
|---|---|---|
| CN | 103903279 A | 7/2014 |
| CN | 104270576 A | 1/2015 |
| JP | 2012137749 A | 7/2012 |

* cited by examiner

IMAGE PROCESSING METHOD AND SYSTEM FOR VISION SYSTEM

TECHNICAL FIELD

The present invention pertains to the field of bionics and particularly relates to an image processing method and system for a vision system.

BACKGROUND

Robotics integrates cybernetics, mechatronics, bionics, materialogy and other technologies and is infiltrating into every corner of our lives at an unprecedented speed. Robots operating on the ground, in water and in the air in lieu of human beings are a typical manifestation of science and technology serving the humankind. At present, robots developed globally have been well capable of leg and arm movement. On the other hand, just like humans who perceive 80% of information in the objective world through their eyes, vision is also one of the most important perceptions for robots.

Currently, vision systems of robots are typically accomplished by cameras for capturing images. However, due to changing surroundings and gestures of the robots, vibration of their bodies and other issues, cameras employed in such vision systems tend to have three degrees of freedom, i.e., each be capable of freely rotating about three axes including a horizontal axis (up and down rotation), a vertical axis (left and right rotation) and an optical axis. Such rotations tend to cause blurring of images captured by the cameras. In the existing state of the art, there have been a lot of studies on the rotations about the horizontal and vertical axes, as well as, established systems and methods for dealing with the issue of unclear images caused by the rotations about the two axes. However, insofar, the impact of the rotation about the optical axis on the capture of images by the cameras has been rarely studies. When a camera rotates about its optical axis by a certain angle, images captured by the camera will suffer from rotational blurs of different magnitude if they remain unprocessed.

SUMMARY OF THE INVENTION

It is an objective of the present invention to address the above-described issue of unclear images captured by cameras when rotating about their optical axes by presenting an image processing method and system for a vision system.

To this end, the subject matter of the present invention is as follows:

The present invention provides an image processing method for a vision system. The vision system includes a central processor, at least two camera groups and a sensor for obtaining a rotation angle signal of each of the camera groups, the camera groups each includes at least one camera and is configured to capture images and passes the images to the central processor, the sensor is configured to send the obtained rotation angle signal to the central processor, wherein during a conjugate rotation of two of the camera groups about respective optical axes thereof, the central processor is configured to perform rotation angle compensation on the images based on an angle of rotation of the two camera groups.

Further, the rotation angle signal may include a magnitude of the angle of rotation or a magnitude of a speed of rotation of each of the camera groups about the respective optical axis thereof.

Further, the sensor may capture the rotation angle signal at a same time as when the camera groups capture the images.

Further, the compensation may be accomplished by:
obtaining, by the sensor, a magnitude $\theta$ of the angle of rotation of the two camera groups and sending the magnitude $\theta$ to the central processor; and
normalizing the two images by the central processor through rotating the two images by an angle of $\theta$ in a direction opposite to a direction in which the camera groups have rotated.

Further, the compensation may be accomplished by:
obtaining, by the sensor, a magnitude v of a speed of rotation of the two camera groups and sending the magnitude v to the central processor; and
stabilizing the two images by the central processor through rotating the two images at a speed of v in a direction opposite to a direction in which the camera groups have rotated.

Further, the compensation may be accomplished by:
obtaining a magnitude $\alpha$ of an angle of rotation of the two images by the central processor by means of image processing; and
normalizing the two images by the central processor through rotating the two images by an angle of a in a direction opposite to a direction in which the two images have rotated.

Further, the compensation may be accomplished by:
obtaining, by the sensor, a magnitude $\alpha$ of the angle of rotation of the two camera groups and sending the magnitude $\alpha$ to the central processor; and
performing, by the central processor, a matching calculation on the two images based on the magnitude $\alpha$ of the angle of rotation to obtain a disparity map.

Further, the compensation may be accomplished by the steps of:
1) obtaining, by the sensor, a magnitude $\theta$ of the angle of rotation of the two camera groups and sending the magnitude $\theta$ to the central processor;
2) rotating the two images by the central processor by an angle of $\theta$ in a direction opposite to a direction in which the two camera groups have rotated, thereby obtaining two compensated images;
3) obtaining, by the central processor, a magnitude $\beta$ of the angle of rotation of the two compensated images resulting from step 2) with respect to those prior to the rotation of the two camera groups, wherein $\beta$ is an angle by which the two compensated images resulting from step 2) are to be rotated and hence normalized; and
4) normalizing, by the central processor, the two compensated images resulting from step 2) by rotating the two compensated images by an angle of $\beta$.

The present invention also provides a image processing system for a vision system, including: at least one camera group, each capable of rotating about an optical axis thereof; a sensor for obtaining a rotation angle signal of the at least one camera group; and a central processor, configured to receive at least one image captured by the at least one camera group and the rotation angle signal and compensate for the at least one image based on the rotation angle signal.

Further, the rotation angle signal may include a magnitude of the angle of rotation or a magnitude of a speed of rotation of the at least one camera group about the optical axis thereof.

Further, a number of the at least one camera group may be two, wherein the two camera groups are capable of rotating about respective optical axes thereof.

Further, during a conjugate rotation of the two camera groups about the respective optical axes thereof, the central processor may obtain a polar offset from an angle of the conjugate rotation and processes images captured by the two camera groups to normalize the images.

Compared with the prior art, the present invention has the following advantages:

It solves the problem of unclear images captured by a camera that is rotating about its own optical axis in response to the rotation of a target object or scene. In particular, it solves the problem of vertical offsets between images captured by two camera groups that are rotating about their own optical axes conjugately for a certain reason, for example, when they are tracking a target object.

DETAILED DESCRIPTION

The present invention will be described in greater detail below with reference to the accompany drawings and specific embodiments. Features and advantages of the invention will be more apparent from the following detailed description, and from the appended claims. Note that the figures are provided in a very simplified form not necessarily presented to scale, with the only intention to facilitate convenience and clarity in explaining the embodiments.

Figure 1:
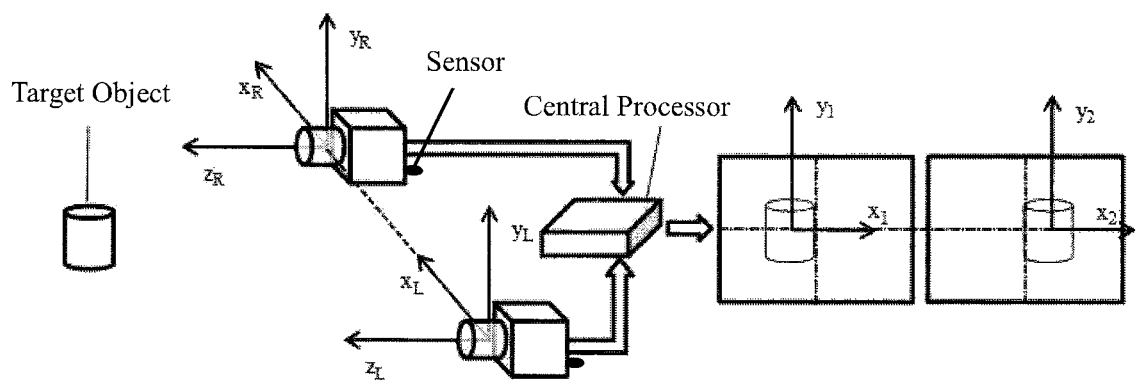
FIG. 1 is a schematic illustration of two images captured by two camera groups in their normal orientation in an image processing method for a vision system according to an embodiment of the present invention.

FIG. 1 shows an image processing method for a vision system according to the present invention. The vision system includes a central processor, at least two camera groups (each includes at least one camera) and a sensor for capturing a rotation angle signal of each of the camera groups. The camera groups capture images and pass the images to the central processor, and the sensor sends the rotation angle signal to the central processor. When the two camera groups rotate about their own optical axes conjugately (i.e., in the same direction by the same angle), the central processor performs rotation angle compensation on the images based on the angle of rotation of the camera groups.

In addition, the rotation angle signal includes a magnitude of the angle of rotation or a magnitude of the speed of rotation of the camera groups about their own optical axes.

In addition, the sensor captures the rotation angle signal at the same time as when the camera groups capture the images.

In this embodiment, each of the camera groups can alternatively include two or more cameras arranged side by side, including a wide-angle camera and a telescopic camera. With the wide-angle and telescopic cameras, the camera group can quickly locate a target object and track it with high accuracy.

For each of the camera groups, when it is oriented normally, the direction of arrangement of lateral pixels in its photosensitive chip is defined as an X-axis, the direction of arrangement of vertical pixels is defined as a Y-axis, and its optical axis as a Z-axis. When the camera group has rotated about its optical axis (Z-axis) by a certain angle, the X- and Y-axes in the new orientation are defined as X'- and Y'-axes, respectively. In this embodiment, in the normal orientation of the two camera groups, coordinates in their systems are denoted respectively as $(x_L, y_L, z_L)$ and $(x_R, y_R, z_R)$. After the two camera groups have rotated about their respective optical axes, coordinates in the new orientations are denoted respectively as $(x_L', y_L')$ and $(x_R', y_R')$.

In the normal orientation of the two camera groups, the horizontal directions of two images captured by them are defined respectively as $X_1$- and $X_2$-axes, and vertical directions thereof respectively as $Y_1$- and $Y_2$-axes. Here, the $X_1$- and $X_2$-directions of the two images coincide with each other.

Figure 2:
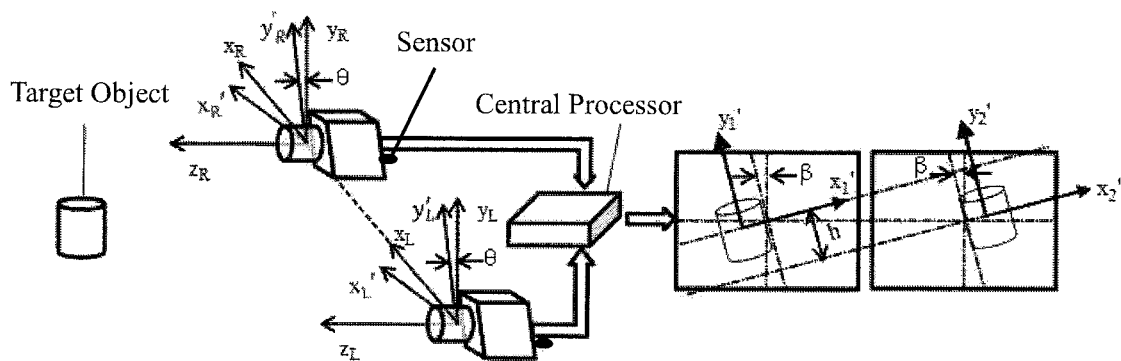
FIG. 2 is a schematic illustration of two images captured by the two camera groups that have conjugately rotated in the image processing method according to the embodiment of the present invention.
Figure 3:
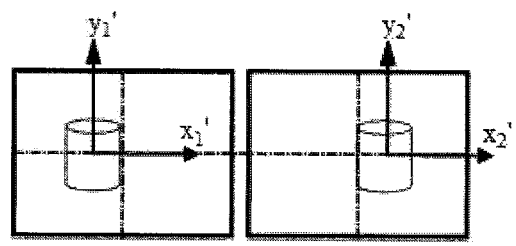
FIG. 3 is a schematic illustration of the two images of FIG. 2 that have been compensated for in the image processing method according to the embodiment of the present invention.

As shown in FIG. 2, after the two camera groups have rotated about their own Z-axes conjugately, the horizontal directions of two images captured by them are defined respectively as $X_1'$- and $X_2'$-axes, and vertical directions thereof respectively as $Y_1'$- and $Y_2'$-axes. In this case, an offset in the Y-axis direction will be generated by the two camera groups. As a result, while the frames of the two captured images remain upright, the two images themselves have rotated by a certain angle. For this reason, their $X_1'$- and $X_2'$-axes are not coincident with each other anymore, rather they are offset from each other in the direction of the $Y_1'$- or $Y_2'$-axis by a distance h. Herein, the angles of rotation of the two images are the same (because the corresponding cameras have rotated by the same angle).

The offset caused by the conjugate rotation of the two camera groups in the same direction can be compensated for in the way described below.

The sensor obtains a magnitude $\theta$ of the angle of rotation of the two camera groups and sends the magnitude $\theta$ to the central processor, wherein $\theta$ refers to the angle between the X- and X-' axes of each of the two camera groups and herein the two camera groups have rotated by the same angle.

The central processor rotates each of the two images by an angle of $\theta$ in the direction opposite to the direction of rotation of the camera groups to make the $X_1'$- and $X_2'$-axes of the two images coincident with each other again, so that and the two images are normalized.

In another embodiment, in addition to the normalization, the two images are further stabilized through a compensation process detailed below.

The sensor obtains a magnitude v of a speed at which the two camera groups have conjugately rotated and provide the magnitude v to the central processor.

The central processor rotates each of the two images at a speed of v in the direction opposite to the direction of rotation of the camera groups so that the two images are stabilized.

As conceivable by those skilled in the art, in another embodiment, the compensation process may specifically include:

Obtaining a magnitude $\alpha$ of an angle of rotation of the two images by the central processor by means of image processing; and rotating the two images by an angle of a in the direction opposite to the direction in which they have rotated to make the $X_1'$- and $X_2'$-axes coincide with each other, so that the two images are normalized, wherein $\alpha$ is the angle by which each of the images is to be rotated and thus normalized.

Similarly, in another embodiment, an accurate disparity map of the two images can be quickly obtained by means of image processing. Specifically, the sensor obtains a magnitude α of the angle of rotation of the two camera groups and provides the magnitude α to the central processor.

The central processor then performs a matching calculation on the two images and obtains the disparity map based on the magnitude α of the angle of rotation.

It is possible for those skilled in the art to conceive a more accurate image processing method, in which a compensation process includes the steps of:

1) the sensor obtaining a magnitude θ of the angle of rotation of the two camera groups and providing the magnitude θ to the central processor, wherein θ is the angle between the X-axis before the rotation and the X'-axis after the rotation of the two camera groups;

2) the central processor rotating the two images by an angle of θ in the direction opposite to the direction in which the camera groups have rotated to obtain two compensated images;

3) the central processor obtaining by itself a magnitude β of an angle of rotation of the two compensated images from step 2), wherein β is an angle between the compensated image and the finally normalized image; and 4) the central processor rotating the two compensated images from step 2) by an angle of β so that their $X_1'$- and $X_2'$-axes are coincident with each other and that the two images are hence normalized.

It is possible for those skilled in the art to conceive that there may also be only one camera group included. Accordingly, the present invention further provides another image processing method for a vision system. The vision system includes a central processor and at least one camera group. The camera group captures an image and provides the image to the central processor. In the event the camera group has rotated about its optical axis (in response to the rotation of a target object or scene), the central processor compensates for and normalizes the image based on the angle of rotation of the camera group.

In case of only one camera group, the compensation can be accomplished in the manner described below.

The sensor obtains a magnitude θ' of the angle of rotation of the camera group and provides the magnitude θ' to the central processor, wherein θ' represents the angle of rotation of the camera group.

The central processor then rotates the image by an angle of θ' in the direction opposite to the direction in which the camera group has rotated so as to normalize the image. In this method, the image is normalized by measuring the angle of rotation of the camera group and then compensating for the image.

Accordingly, in another embodiment, a compensation process includes:

the central processor obtaining a magnitude α' of an angle of rotation of the image by means of image processing;

the central processor rotating the image in the direction opposite to the direction of rotation of the image by an angle of α' so that the image is normalized, wherein α' is an angle between the image and the finally normalized image. In this method, the angle of rotation is obtained directly from an analysis of the image and serves as a basis for rotating and hence normalizing the image.

Based on the advantages of both the above two compensation processes, it is possible for those skilled in the art to conceive another compensation process including the steps of:

1) the sensor obtaining a magnitude θ' of the angle of rotation of the camera group and providing the magnitude θ' to the central processor, wherein θ' represents the angle of rotation of the camera group;

2) the central processor rotating the image in the direction opposite to the direction of rotation of the camera group by an angle of θ' to obtain a compensated image;

3) the central processor obtaining by itself a magnitude β' of an angle of rotation of the compensated image from step 2), wherein β' is an angle between the compensated image and the finally normalized image; and 4) the central processor rotating the compensated image from step 2) by an angle of β' so that the image is normalized. This method integrates the advantages of the forgoing two methods by first performing quick rotation compensation on the image based on the angle of rotation of the camera group and then conducting a more accurate rotation compensation thereon based on an analysis of the image.

The present invention also provides an image processing system for a vision system, including:

at least one camera group, each rotatable about its optical axis, wherein in addition to the rotation about its optical axis, the camera group may have other degrees of freedom such as translation;

a sensor for capturing a rotation angle signal of the camera group; and a central processor for receiving an image captured by the camera group and the rotation angle signal and compensating for the image based on the rotation angle signal.

Further, the rotation angle signal includes a magnitude of the angle of rotation or a magnitude of the speed of rotation of the camera group about its optical axis.

Further, the camera group may include at least two cameras arranged side by side, including a wide-angle camera and a telescopic camera.

Further, two camera groups may be provided, each being capable of rotating about its optical axis.

Further, during a conjugate rotation of the two camera groups about their own optical axes, the central processor may obtain a polar offset from the angle of the conjugate rotation and normalize images captured by the camera groups. As such, the same results as described above can be obtained.

Further, centers of rotation of the two camera groups are arranged on a single base disk which is driven by at least one motor so that the camera groups rotate about their own optical axes in a conjugate manner. Use of the base disk enables the two camera groups to conjugately rotate about their own optical axes under the actuation of the motor for the base disk.

Further, the sensor can be arranged on the motor for base disk in order to measure a rotation angle signal of the motor and output the rotation angle signal to the central processor.

The present invention solves the problem of unclear images captured by a camera that is rotating about its optical axis. In particular, it solves the problem of unclear images captured by two bionic camera groups that are rotating about their own optical axes conjugately and hence cause vertical offsets.

The preferred embodiments presented above are merely examples and are in no way meant to limit the scope of the present invention. Any change or modification made by those of ordinary skill in the art in light of above disclosure falls within the scope of the appended claims.

What is claimed is:

1. An image processing method for a vision system comprising a central processor, at least two camera groups and a sensor, each of the at least two camera groups comprising at least one camera, the method comprising:
  capturing at least two images and passing the at least two images to the central processor by the at least two camera group;
  obtaining a rotation angle signal of each of the at least two camera groups and sending the obtained rotation angle signal to the central processor by the sensor; and
  performing, by the central processor, rotation angle compensation on the at least two images based on an angle of rotation of the at least two camera groups during a conjugate rotation of two of the at least two camera groups about respective optical axes thereof;
  wherein performing the rotation angle compensation comprises:
  obtaining a magnitude $\alpha$ of the angle of rotation of each of the at least two images by the central processor by means of image processing; and
  normalizing the at least two images by the central processor through rotating the at least two images by an angle of $\alpha$ in a direction opposite to a direction in which the at least two images have rotated.

2. The image processing method for a vision system according to claim 1, wherein the rotation angle signal includes the magnitude $\alpha$ of the angle of rotation or a magnitude v of a speed of rotation of each of the at least two camera groups about the respective optical axes thereof.

3. The image processing method for a vision system according to claim 1, wherein the sensor captures the rotation angle signal at a same time as when the at least two camera groups capture the at least two images.

4. The image processing method for a vision system according to claim 2, wherein performing the rotation angle compensation further comprises:
  obtaining, by the sensor, the magnitude v of the speed of rotation of each of the at least two camera groups and sending the magnitude v to the central processor; and
  stabilizing the at least two images by the central processor through rotating the at least two images at a speed of v of the speed of rotation in a direction opposite to a direction in which the at least two camera groups have rotated.

5. An image processing method for a vision system comprising a central processor, at least two camera groups and a sensor, each of the at least two camera groups comprising at least one camera, wherein the method comprising:
  capturing at least two images and passing the at least two images to the central processor by the at least two camera groups;
  obtaining a rotation angle signal of each of the at least two camera groups and sending the obtained rotation angle signal to the central processor by the sensor; and
  performing, by the central processor, rotation angle compensation on the at least two images based on an angle of rotation of the at least two camera groups during a conjugate rotation of two of the at least two camera groups about respective optical axes thereof,
  wherein performing the rotation angle compensation comprises:
  obtaining, by the sensor, a magnitude $\alpha$ of the angle of rotation of each of the at least two camera groups and sending the magnitude $\alpha$ to the central processor; and
  performing, by the central processor, a matching calculation on the at least two images based on the magnitude $\alpha$ of the angle of rotation to obtain a disparity map.

6. An image processing method for a vision system comprising a central processor, at least two camera groups and a sensor, each of the at least two camera groups comprising at least one camera, wherein the method comprising:
  capturing at least two images and passing the at least two images to the central processor by the at least two camera groups;
  obtaining a rotation angle signal of each of the at least two camera groups and sending the obtained rotation angle signal to the central processor by the sensor; and
  performing, by the central processor, rotation angle compensation on the at least two images based on an angle of rotation of the at least two camera groups during a conjugate rotation of two of the at least two camera groups about respective optical axes thereof,
  wherein performing the rotation angle compensation comprises:
  1) obtaining, by the sensor, a magnitude $\theta$ of the angle of rotation of each of the at least two camera groups and sending the magnitude $\theta$ to the central processor;
  2) rotating the at least two images by the central processor by an angle of $\theta$ in a direction opposite to a direction in which the at least two camera groups have rotated, thereby obtaining at least two compensated images;
  3) obtaining, by the central processor, a magnitude $\beta$ of another angle of rotation of the at least two compensated images resulting from the step 2) with respect to the at least two images prior to the rotation of the at least two camera groups, wherein $\beta$ is the another angle by which the at least two compensated images resulting from the step 2) are to be rotated and hence normalized; and
  4) normalizing, by the central processor, the at least two compensated images resulting from the step 2) by rotating the at least two compensated images by an angle of $\beta$.

7. The image processing method for a vision system according to claim 5, wherein the rotation angle signal includes a magnitude of the angle of rotation or a magnitude v of a speed of rotation of each of the at least two camera groups about the respective optical axes thereof.

8. The image processing method for a vision system according to claim 5, wherein the sensor captures the rotation angle signal at a same time as when the at least two camera groups capture the at least two images.

9. The image processing method for a vision system according to claim 7, wherein performing the rotation angle compensation further comprises:
  obtaining, by the sensor, the magnitude v of the speed of rotation of each of the at least two camera groups and sending the magnitude v to the central processor; and
  stabilizing the at least two images by the central processor through rotating the at least two images at a speed of v of the speed of rotation in a direction opposite to a direction in which the at least two camera groups have rotated.

10. The image processing method for a vision system according to claim 6, wherein the rotation angle signal includes a magnitude of the angle of rotation or a magnitude v of a speed of rotation of each of the at least two camera groups about the respective optical axes thereof.

11. The image processing method for a vision system according to claim 6, wherein the sensor captures the rotation angle signal at a same time as when the at least two camera groups capture the at least two images.

12. The image processing method for a vision system according to claim 10, wherein performing the rotation angle compensation further comprises:
- obtaining, by the sensor, the magnitude v of the speed of rotation of each of the at least two camera groups and sending the magnitude v to the central processor; and
- stabilizing the at least two images by the central processor through rotating the at least two images at a speed of v of the speed of rotation in a direction opposite to a direction in which the at least two camera groups have rotated.

* * * * *